Dec. 1, 1936.  C. A. THOMAS ET AL  2,062,845
PREPARED RESIN
Filed June 17, 1930
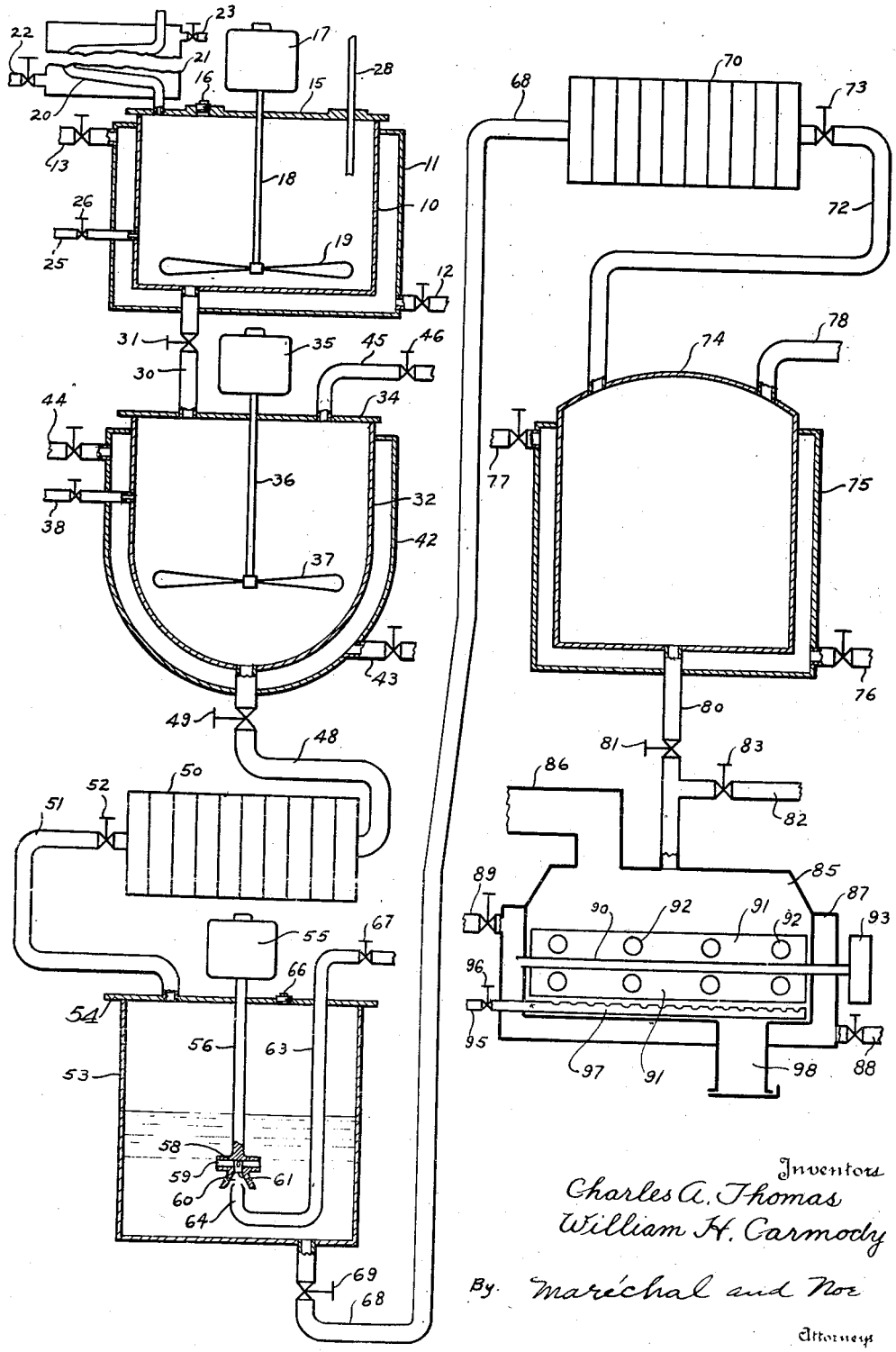
Inventors
Charles A. Thomas
William H. Carmody
By Maréchal and Noe
Attorneys Patented Dec. 1, 1936

2,062,845

UNITED STATES PATENT OFFICE 2,062,845

PREPARED RESIN

Charles A. Thomas and William H. Carmody, Dayton, Ohio, assignors, by mesne assignments, to Monsanto Petroleum Chemicals, Inc., Dayton, Ohio, a corporation of Delaware Application June 17, 1930, Serial No. 461,798

16 Claims. (Cl. 260—2)

This invention relates to the manufacture of artificial or prepared resins.

One of the principal objects of this invention is to provide such a prepared resin which has characteristics markedly superior in certain respects to the natural resins.

Another object of the invention is to provide a method of producing a prepared resin of controlled character, good color and hardness.

Still another object of the invention is to provide apparatus for carrying out the above method and for producing the above product.

Other objects and advantages of the invention will be apparent from the following description when taken in connection with the accompanying drawing and appended claims.

The single view of the drawing is a diagrammatic representation of apparatus for practicing the method, and for producing the resin-like material of the present invention.

Reference is herein made to the co-pending application of Charles A. Thomas and Carroll A. Hochwalt, Serial No. 294,491, now Patent No. 1,836,629, filed July 21, 1928, and to the co-pending applications of Carroll A. Hochwalt, Serial No. 461,799, now Patent No. 2,035,233, filed of even date herewith, and of Charles A. Thomas, Serial No. 461,807, filed of even date herewith, which relate to the production of resins of a similar character.

In the practicing of this invention, unsaturated hydrocarbon compounds are caused to react in the presence of a suitable catalyst or activating agent, such as anhydrous aluminum chloride, to produce by polymerization an amorphous resinous reaction product, which is found to contain an unsaturated hydrocarbon compound or compounds of high molecular weight. It has been found that this hydrocarbon resin has a molecular weight of about 900 to 1400, and it is believed to have the empirical formula $(C_nH_{2n-2})_x$. By subjecting this material to a saturating treatment, such as a hydrogenating treatment, so that plural bonds of the unsaturated resinous reaction product are more or less completely saturated, an improved resin of lighter color and increased hardness is obtained.

Unsaturated hydrocarbon compounds from various sources may be used in carrying out this invention. Thus cracked distillate, or special fractions of the cracked distillate such as that fraction passing over between 30° C. and 40° C., may be used. Better control of the character of the resultant resin is had by the use of relatively pure unsaturated hydrocarbon compounds, which may be first obtained or separated from crude material such as cracked distillate, and then these pure compounds used in controlled proportions to produce the resin reaction product. Thus an unsaturated hydrocarbon having one double bond may be reacted or polymerized with an unsaturated hydrocarbon having more than one double bond in controlled proportions and under controlled conditions of polymerization, in the presence of an activating agent. Very satisfactory results are secured by reacting a mixture of an olefine with a diolefine under such controlled conditions. For example, diolefine compounds such as hexadiene, isoprene and butadiene react with olefine compounds such as the amylenes (including symmetrical methyl ethyl ethylene, unsymmetrical methyl ethyl ethylene, tri-methyl ethylene, and normal propyl ethylene), ethylene, propylene, octylene, and the like, in the above manner. These compounds are mentioned as representative members of their particular groups which will react with good results to produce a resin reaction product resembling in properties the natural resins.

As an example of the carrying of this invention into effect, the following procedure is described for the reaction or polymerization of normal propyl ethylene with hexadiene. A mixture of these unsaturated hydrocarbons, in the proportion of about one to two mols of normal propyl ethylene to about one mol. of hexadiene, is placed within a container or polymerizing vessel 10 which is in turn enclosed within a suitable jacket 11 having valve controlled inlet and outlet connections 12 and 13 for the supplying of water to jacket 11 for controlling the temperature of the mass within the container. A cover 15 is fastened in gas tight manner on the upper end of the vessel, and this cover is provided with a filling opening normally closed by a plug 16 through which material may be supplied to the interior. Cover 15 supports a motor 17, mounted in any suitable fashion, the shaft 18 of which projects downwardly into the vessel and carries a suitable stirrer or agitator 19 at its lower end. Leading off from the top of chamber 10 is a reflux condenser coil 20 positioned within a suitable cooling jacket 21 to which cooling liquid may be introduced through the valve controlled inlet 22 and discharged through the valve controlled outlet 23. The upper end of this condenser coil is open to atmosphere, as the purpose of it is to condense and return to the container 10 any vapors that may be generated during the reaction.

The unsaturated hydrocarbon compounds are fed into the container 10 through a pipe 25 controlled by valve 26 leading from a suitable source of supply. The activating compound, such as powdered anhydrous aluminum chloride ($Al_2Cl_3$) is added to the unsaturated hydrocarbons through the opening normally closed by plug 16. The aluminum chloride is preferably pulverized to give better contact. This material is also added in small quantities at a time while the contents of the container 10 are being agitated by the motor driven stirrer 19. For example, presuming that twenty-five gallons of a mixture of normal propyl ethylene and hexadiene are to be treated within container 10, aluminum chloride may be satisfactorily added in quantities of approximately six to eight ounces at a time. With the addition of the first batch of aluminum chloride, there is a rather active chemical reaction or condensation with a resultant rise in temperature. It is desirable to control the temperature of the reaction inasmuch as this has a bearing upon the character of the resultant resin, particularly the hardness thereof. The reaction is preferably carried out above 20° C., as then the resultant resin is very materially harder and the yield increases somewhat. However, it is desirable where an atmospheric polymerizing vessel is used that the temperature should not be permitted to rise much above 40° C. Otherwise the polymerizing vessel should be kept under pressure to prevent undue volatilization and loss of resin. Moreover, polymerization at higher temperatures, such as above 65° C., generally gives a resin of poorer color. Very satisfactory results are secured when the temperature is controlled between 25° and 35° C., this being readily accomplished by introducing the aluminum chloride in small amounts with proper agitation to prevent local overheating and by supplying cooling liquid to the cooling jacket 11. This polymerizing reaction is carried out in the absence of water.

Additional batches of aluminum chloride are added from time to time as may be done without unduly increasing the temperature within container 10, and this is repeated with continuous agitation until no further temperature rise results. The amount of aluminum chloride used is also controlled in accordance with the materials being treated, as this is found to have a bearing upon the yield. It is found that the larger the volume of active ingredients being treated at any one time, the less the amount of catalyst needed for optimum results. Thus when treating the above mixture in twenty-five gallon batches, very satisfactory results are secured by the addition of about three pounds of catalyst, this being equivalent to approximately 1.4 grams of catalyst for 100 c. c. of unsaturated hydrocarbons. Where smaller batches are being treated, such for example as a batch of 100 c. c., an increased proportion of catalyst is used to give maximum yield, generally about 3.5 to 3.7 grams of aluminum chloride per 100 c. c. of active ingredients giving optimum results. The quantity of catalyst needed for best results can be readily determined by tests for the particular ingredients and the particular volume of the ingredients being treated, so that this amount can be used in regular plant production. In any event, it is desirable that the amount of catalyst used be not increased materially over four grams per 100 c. c. of active ingredients, as the character of the resultant resin may be deleteriously influenced.

In addition to aluminum chloride, other compounds which hydrolyze in water giving an acid reaction will function satisfactorily to cause the conversion of the unsaturated hydrocarbons into resin,—for example chlorides of iron, boron, zinc, antimony, indium, titanium and tin; benzene sulfonic acid; propyl alcohol saturated with HCl gas; ethyl sulfate, and aniline hydrobromide. The time of the treatment is also found to have a bearing upon the resultant resin, particularly the color. The reaction may proceed as much as twelve hours, but it is found desirable to not leave the catalyst in contact with the material for a period of time much in excess of this, as the resin may be darkened. The reaction is preferably completed in less time, such as about four to six hours, this giving optimum results. A thermometer 28 may be mounted in the cover 15 to conveniently indicate the temperature of the reacting mass.

When the reaction within polymerizing vessel 10 is completed, the material is viscous and dark in color. This material is flowed from the polymerizing vessel through the outlet pipe 30 controlled by valve 31 into a neutralizing tank 32 containing a quantity of neutralizing agent. Tank 32 is provided with a tight fitting cover 34 which carries a motor 35 having a shaft 36 extending within the container and carrying at the lower end thereof suitable stirring blades 37. A valve controlled pipe 38 may be used to supply neutralizing liquid from a suitable reservoir (not shown). Various water soluble alkalies may be used for this neutralizing, but preferably ammonium hydroxide is employed as the excess of this material can subsequently be removed by distillation and it has no injurious effects upon the resulting resin.

The neutralizing treatment is also preferably carried out in the presence of a non-aqueous organic hydroxy compound which is effective to supply hydroxyl radicals for the decomposition and precipitation of the aluminum chloride or other activating agent present. An alcohol, such as ethyl alcohol, functions very satisfactorily for this purpose. Thus with the quantities specified above, about three gallons of a mixture of about 40% by volume of ammonium hydroxide (28% $NH_3$) and 60% by volume of 95% ethyl alcohol gives good results. The stirrer 37 is then started, and the polymerized reaction mass is introduced slowly from container 10 in a controlled stream by pipe 30 into the agitated neutralizing agent within tank 32. The neutralization in the presence of an organic hydroxy compound of this character with proper agitation gives a granular precipitate of aluminum hydroxide which is readily removed by filtration. The neutralization could be carried out in the presence of water but this renders subsequent distillation more difficult and is apt to result in quantities of water being occluded in the resin at this time. Other organic hydroxy liquids which are miscible with water, such as methyl alcohol, acetone, etc., may be used for this purpose. An alcohol or other organic hydroxy liquid saturated with $NH_3$ gas can be used for the neutralization with very satisfactory results.

The neutralization is accompanied by a color change of the reacting mass, the polymerized product changing from a black or dark red to a yellowish red color and thus indicating that the neutralization is completed and the mixture basic in character. The agitating and neutralizing action is generally completed in about half an hour. The ammonia neutralizes all of the aluminum chloride present, forming a flocculent precipitate of aluminum hydroxide. Some of the ammonium chloride formed in the reaction also precipitates in the organic solvents, and a portion of the resin reaction product may also precipitate. In order to insure that the resin is completely dissolved before filtration, an organic solvent which is immiscible in water, such as benzol, carbon tetrachloride, ethylene dichloride, and the like, is added to the neutralizing tank 32 prior to filtration. This organic solvent may be present during the neutralizing reaction and may be initially added to the tank 32 along with the ammonia and alcohol prior to the introduction of the polymerized reaction mass. Generally the addition of about three gallons of benzol is sufficient for this purpose.

When reacting unsaturated hydrocarbons in this manner, it is found that two products are formed, one being an amorphous resinous compound which is readily soluble in organic solvents such as benzol and being the resin that is desired, and another being a gelatinous compound which is insoluble in such solvents. This insoluble compound remains undissolved and is carried down in the precipitate. Tank 32 is provided with a temperature controlling jacket 42 having valve controlled inlet and outlet connections 43 and 44, respectively, by means of which a heating medium such as steam or hot water may be supplied to the heating jacket. After the neutralizing reaction is completed, the contents of tank 32 are preferably heated with steam by jacket 42 to a temperature of about 60° C. to insure that the produced resinous product is all dissolved. During this heating reaction, substantially all the excess ammonia is liberated and passes through the distillate offtake 45 having control valve 46.

The mass is then passed by discharge pipe 48 having control valve 49 to a suitable filter, such as a filter press 50, where the undissolved materials are removed from the liquid. The filtered sludge removed in filter press 50 is preferably treated to recover aluminum oxide ($Al_2O_3$) and ammonium chloride as by-products. The filtrate passes by pipe 51 having control valve 52 into a hydrogenating vessel 53 provided with a tight fitting cover 54 carrying a motor 55. The motor is connected to a depending shaft 56 which extends down adjacent the lower portion of container 53 and is provided at its lower end with a rotary dispersion member adapted to effect thorough agitation and to effect intimate mixture of the materials within the container 53. As shown, this member comprises a rotary disk 58 which is hollow, or has radial passages 59 communicating with a peripheral discharge. The bottom of the disk carries a conical baffle forming an intake mouth 60 which communicates with a central passage 61, the latter in turn communicating with the passage or passages 59. Cover 54 carries a pipe 63 which extends down within the container and terminates in an upturned nozzle or jet 64 directed into the intake mouth 60.

After the filtrate has been introduced into vessel 53, a small amount of a suitable catalyst is then introduced through the opening in cover 54 normally closed by a plug 66. Satisfactory results are secured with a catalyst such as platinum black or platinum oxide ($Pt_2O_3$) as well as with oxides of nickel. The high speed dispersion member 58 is then started, and hydrogen gas is admitted in a controlled stream through pipe 63 controlled by valve 67. The hydrogen gas passes along with the liquid and suspended platinum black or other catalyst into the intake mouth 60 of the rotary member, and is thrown outwardly by centrifugal force through the peripheral discharge of this member, thereby securing a highly effective mixing and intimate contact of the hydrogen gas with the dissolved resin reaction product. In the presence of a highly effective catalyst of this character, the unsaturated resin reaction product takes up hydrogen to saturate plural bonds to thereby more or less completely saturate this resin reaction product. The hydrogenating reaction may be carried out at ordinary temperatures, a suitable time being permitted for the reaction to go to the desired state of completion. For example, a reaction time of about three hours, gives very satisfactory results.

The high speed agitation is then stopped, valve 67 closed to terminate the introduction of hydrogen gas and the resultant hydrogenated material is then passed by pipe 68 having control valve 69 to a suitable filter, such as a filter press 70, where the suspended catalyst is removed from the hydrogenated liquid and thereby recovered, this catalyst being suitable for repeated use in the process. The filtrate passes by pipe 72 having control valve 73 to a concentration still 74 having an external heating jacket 75 provided with valve controlled inlet and outlet connections 76 and 77, respectively, for the introduction of a suitable heating medium such as steam.

Vessel 74 is provided with a tight fitting cover carrying a distillate offtake pipe 78 communicating with a suitable condenser (not shown). Steam is admitted to jacket 75 to distill off the more volatile constituents, including the benzol and alcohol, which pass off through the offtake 78 and are condensed and may be recovered for repeated use in the process. Distillation is continued until a thermometer in the distillation line rises to approximately 100° C. at which time substantially all of the alcohol and benzol, and any water, will have been driven off of the resulting resin, which is left in the vessel 74 as a semifluid or pasty mass.

If desired, the concentration of the resin may be controlled so as to leave a calculated amount of solvent in the resin so that it is maintained in solution form. This solution may then be withdrawn from the concentrating still 74 through pipe 80 having control valve 81, and through branch pipe 82 having control valve 83 to a place of storage. The resin in solution form in benzol, or other solvent such as solvent naphtha, may be used directly in the paint and varnish industries, or for other suitable uses without concentrating to dryness. If a solid resin is desired, the distillation is continued as described above until substantially all of the readily volatile solvents have been driven off, sufficient solvent or retained higher oils being left in the resin so that it is sufficiently fluid to flow through pipe 80 into an agitating and drying vessel 85.

This is preferably a closed vessel, having an offtake 86 leading to a suitable vent or stack, and a surrounding jacket 87 having valve controlled inlet and outlet connections 88 and 89 respectively for supplying a heating medium such as steam or hot oil thereto. Mounted within suitable bearings in the walls of vessel 85 is a horizontal shaft 90 carrying a plurality of radially extending flat blades or paddles 91, each blade being provided with a plurality of perforations or relatively large holes 92. The shaft 90 extends to the exterior of the vessel and carries a suitable pulley 93, or is otherwise connected to a line shaft or driving motor, so that the stirrer may be rotated at a relatively slow speed. A fluid is supplied to the container 85 by means of pipe 95 having control valve 96 communicating with a suitable perforated coil 97 mounted within the bottom of vessel 85 beneath the agitator 90. Preferably a non-aqueous non-oxidizing gaseous fluid, such as carbon dioxide, is thus introduced and passed through the resultant resinous mass while it is being agitated, so that intimate contact of the treated gas with the resin is secured. At the same time, a heating medium is introduced into jacket 87, and the temperature of the mass is raised to a controlled higher temperature.

It is found that where a non-oxidizing gas of this character is used and the mass is kept agitated, the heating jacket may be raised to a materially higher temperature with resultant rapid increase in the drying of the resin without injury to the resin. Thus heated oil at a temperature of about 180° C. may be supplied to this external jacket, and the drying operation completed in several hours. This treatment drives off any remaining solvent and higher oils present in the resin which tend to make it soft. By the use of a non-oxidizing fluid, a clear light colored resin of good character is regularly obtained. Air may be used, if desired, for the drying operation; but generally the temperature of the agitated mass should be lowered and the drying operation should be continued for a longer time to obtain a hard resin of good color. By avoiding the use of steam or substantial quantities of water throughout the process, the occlusion of water in the resin is avoided and a clear product obtained. The resin is then removed from the drying vessel 85, as by the bottom outlet 98, and placed in suitable collecting troughs or shallow pans where it is allowed to cool or harden. While any suitable form of feed from one vessel to the other may be provided, a gravity feed throughout the entire system, such as disclosed herein, is preferred for commercial installations.

While a particular treatment for the hydrogenation of the resin as obtained from a mixture of normal propyl ethylene and hexadiene has been specifically described above, it is to be understood that this method is generally applicable to the treatment of unsaturated hydrocarbon resin reaction products.

It is to be understood that the term "unsaturated hydrocarbons" as used herein, refers to hydrocarbon compounds which unite with other compounds, such for example, as the halogens, to form addition products without splitting off a new compound. Unsaturated hydrocarbons are capable of giving the Baeyer test for unsaturation. (Textbook of Organic Chemistry, Holleman, 6th ed. page 131.)

The hydrogenated resin so prepared in accordance with this invention is found to have a light yellow color, is generally clear, and is harder than the unsaturated hydrocarbon resin which has not been subjected to the hydrogenating treatment. When dissolved in a suitable oil solvent, such as naphtha, the resin forms a clear almost colorless liquid, which when brushed onto a surface leaves a clear film. The prepared resin is non-acid in reaction and is unsaponifiable. Another very important and desirable characteristic of the prepared resin is that it does not retard the oxidizing action of linseed oil, so that a varnish can be prepared with this resin which compares favorably in speed of drying with lacquers.

While the method herein described and the apparatus for carrying out that method and the products so produced constitute preferred embodiments of our invention, it is to be understood that the invention is not limited to this precise method or apparatus, or precise product, and that changes may be made therein without departing from the scope of the invention which is defined in the appended claims.

What is claimed is:

1. In the manufacture of prepared resin, the method which comprises reacting an unsaturated hydrocarbon having one double bond and an unsaturated hydrocarbon having more than one double bond in the presence of a metallic halide activating agent which hydrolyzes to give an acid reaction to produce an unsaturated resinous reaction product, and then subjecting the resinous reaction product to the action of hydrogen.

2. In the manufacture of prepared resin, the method which comprises reacting an olefine with a diolefine in the presence of a metallic halide activating agent which hydrolyzes to give an acid reaction to produce a resinous reaction product, and then hydrogenating the formed resinous reaction product.

3. A prepared resin comprising a hydrogenated reaction product of a mixture of unsaturated hydrocarbons comprising essentially an olefine and a diolefine reacted together.

4. In the manufacture of prepared resin, the method which comprises reacting together a mixture of unsaturated hydrocarbons of varying degrees of unsaturation including a diolefine in the presence of a metallic halide activating agent which hydrolyzes to give an acid reaction, to give a resinous reaction product, neutralizing the reaction product mass with an alkaline material in the presence of a hydroxy compound selected from the group consisting of methyl alcohol and ethyl alcohol, adding, prior to filtration, an organic solvent for the resinous reaction product, the solvent being immiscible with water, filtering the undissolved materials from the neutralized mass, passing a stream of hydrogen gas into the filtrate in the presence of a hydrogenation catalyst while agitating the filtrate, filtering the hydrogenated material and distilling the resulting filtrate to obtain the residual resin.

5. In the manufacture of prepared resin, the method which comprises reacting together a mixture of unsaturated hydrocarbons including a diolefine in the presence of a metallic halide activating agent which hydrolyzes to give an acid reaction, to give a resinous reaction product, neutralizing the reaction product mass with an alkaline material, adding, prior to filtration, an organic solvent for the resinous reaction product, the solvent being immiscible with water, filtering the undissolved materials from the neutralized mass, passing a stream of hydrogen gas into the filtrate in the presence of a hydrogenation catalyst while agitating the filtrate, filtering the hydrogenated material and distilling the resulting filtrate to obtain the residual resin.

6. In the manufacture of prepared resin, the method which comprises forming a resinous reaction product by polymerizing a mixture of unsaturated hydrocarbons comprising a fraction of cracked petroleum distillate, reducing the degree of unsaturation of the resin, while avoiding destructive hydrogenation such as to liquefy the resin by hydrogenating the resultant resinous reaction product in the presence of a hydrogenation catalyst, separating the catalyst from the hydrogenated material, and recovering the resultant resin from the separated material.

7. In the manufacture of prepared resin, the method which comprises reacting together a mixture of liquid unsaturated hydrocarbons of varying degrees of unsaturation in the presence of a metallic halide activating agent which hydrolyzes to give an acid reaction to produce an unsaturated resinous reaction product dissolved in residual liquid hydrocarbons, neutralizing the reaction mass, separating undissolved materials from the neutralized mass, reducing the degree of unsaturation of the resin, while avoiding destructive hydrogenation such as to liquefy the resin by hydrogenation in the presence of a hydrogenation catalyst, filtering the hydrogenated material, distilling the resultant filtrate, and introducing into the residue an inert nonaqueous gaseous fluid while heating and agitating the residue.

8. In the manufacture of prepared resin, the method which comprises reducing the degree of unsaturation of the resin by hydrogenating an unsaturated synthetic resinous reaction product produced by polymerizing a mixture of unsaturated hydrocarbons consisting of a substantial number of the members of the group of hydrocarbons present in a fraction of cracked petroleum distillate, while avoiding destructive hydrogenation such as to liquefy the resin.

9. In the manufacture of prepared resin, the method which comprises passing a stream of hydrogen gas into a solution of an unsaturated polymerized resinous hydrocarbon produced by polymerization of a cracked petroleum distillate fraction, in the presence of a hydrogenation catalyst and while agitating the solution whereby the degree of unsaturation is reduced, while avoiding destructive hydrogenation such as to liquefy the resin.

10. A synthetic resin comprising a resinous polymerization product of unsaturated cracked petroleum hydrocarbons of varying degrees of unsaturation and further characterized in that its degree of unsaturation has been reduced by hydrogenation, while avoiding destructive hydrogenation such as to liquefy the resin.

11. In the manufacture of prepared resin, the method which comprises reacting a fraction of cracked petroleum distillate in the presence of a metallic halide activating agent, which hydrolyzes to give an acid reaction, to produce a resinous polymerization product, and then reducing the degree of unsaturation of the product by hydrogenation without substantial liquefaction of the resin product, while avoiding destructive hydrogenation such as to liquefy the resin.

12. In the manufacture of prepared resin, the method which comprises reacting a fraction of cracked petroleum distillate in the presence of a metallic halide activating agent which hydrolyzes to give an acid reaction to produce a colored unsaturated resinous polymerization product, and reducing the degree of unsaturation of said product by hydrogenation to produce a light yellow, hard resin, while avoiding destructive hydrogenation such as to liquefy the resin.

13. A synthetic hydrocarbon resinous polymer obtained by reducing the degree of unsaturation by hydrogenation, of an unsaturated resinous hydrocarbon polymer formed by the polymerization in the presence of a metallic halide activating agent of a cracked petroleum distillate fraction, while avoiding destructive hydrogenation such as to liquefy the resin.

14. A synthetic hydrocarbon resinous polymer obtained by reducing the degree of unsaturation by hydrogenation, of an unsaturated resinous hydrocarbon polymer formed by the polymerization of a cracked petroleum distillate fraction, while avoiding destructive hydrogenation such as to liquefy the resin.

15. In the manufacture of a resin which is essentially a polymerized unsaturated hydrocarbon, wherein a liquid mixture composed essentially of cracked liquid petroleum hydrocarbons which are capable of forming resins under the influence of a polymerizing agent, is polymerized in the presence of a polymerizing agent after which the reacted mixture is treated to separate the polymerizing agent from the polymerized product, the improvement characterized in that the polymerized product is subjected to the action of elemental hydrogen and a hydrogenation catalyst under conditions whereby the color of the product is improved, while avoiding destructive hydrogenation such as to liquefy the resin.

16. In the manufacture of prepared resin, the method which comprises reacting together a mixture of liquid unsaturated hydrocarbons of varying degrees of unsaturation with an acid reacting polymerizing agent, whereby a solution of resin, dissolved in residual liquid hydrocarbon, is obtained, neutralizing the reaction mass, separating undissolved materials from the neutralized mass, and finally reducing the degree of unsaturation of the resin by hydrogenation while avoiding destructive hydrogenation, such as would liquefy the resin.

CHARLES A. THOMAS.
WILLIAM H. CARMODY.